United States Patent Office 3,838,115
Patented Sept. 24, 1974

3,838,115
SILYL-NORBORNENE AND INTERPOLYMERS PREPARED OF SAME
William C. Bond, Jr., Baton Rouge, La., assignor to Copolymer Rubber & Chemical Corporation
No Drawing. Continuation of abandoned application Ser. No. 112,069, Feb. 2, 1971. This application Jan. 29, 1973, Ser. No. 327,704
Int. Cl. C08f 17/00
U.S. Cl. 260—80.71    9 Claims

ABSTRACT OF THE DISCLOSURE

An interpolymer formed by the addition polymerization of ethylene, at least one monoolefin having the general formula $CH_2=CH-R$, with or without a polyene and a silyl norbornene having the general formula

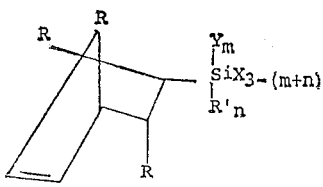

in which R is hydrogen, halogenated or unhalogenated alkyl, arylalkyl, alkenyl or 6- or 7-alkylidene group, R' is an alkyl, aryl or alkenyl group, X is hydrogen and Y is halogen, and n and m is a number of from 0 to 2 such that the sum of m and n is never more than 2.

---

This is a continuation of application Ser. No. 112,069, filed Feb. 2, 1971 now abandoned.

This invention relates to silyl-norbornenes and to new and improved elastomers formed by interpolymerization of such silyl-norbornenes with ethylene and one or more monoolefins having from 3–20 carbon atoms, with or without the addition of a polyene.

It is an object of this invention to produce a class of compounds hereinafter identified as silyl-norbornenes and to make use of such silyl-norbornenes as monomers in the preparation of interpolymers with ethylene and one or more monoolefins having from 3–20 carbon atoms in the manufacture of a terpolymer or with the addition of a polyene to produce a sulfur vulcanizable EPDM type elastomer.

As used herein, the term "silyl norbornene" is meant to refer to a monomer having the general formula

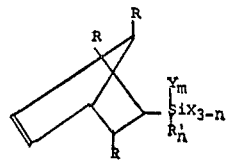

in which R is a halogenated or unhalogenated alkyl group such as methyl, ethyl, propyl, isopropyl, butyl and the like substituted or unsubstituted alkyl group having from 1–18 carbon atoms, an aryl group such as benzyl, phenyl, naphthyl and the like, an aryl alkyl group such as tolyl, xylyl and the like, alkenyl groups such as allyl, vinyl, crotyl and the like, or an alkylidene group in the 6- and 7-position such as ethylidene, isopropylidene and the like; R' is an alkyl, aryl or alkenyl group as described above, X is hydrogen, n is a number of from 0 to 2, Y is halogen and m is a number of from 0 to 2 such that m plus n never totals more than 2. The silyl norbornenes, prepared in accordance with the practice of this invention are represented by 5-silyl-2-norbornene; 5-monochlorosilyl-2-norbornene; 5-dibromosilyl-2-norbornene; 5-(ethylmethyl-silyl)-2-norbornene; 5-silyl-6-ethyl-2-norbornene;

5-silyl-7-isopropylidene-2-norbornene; 1-benzyl-5-silyl-2-norbornene; 5-(chloro-methyl-silyl)-2-norbornene.

The silyl norbornenes of this invention can be prepared by reduction of the corresponding halosilyl norbornenes having the general formula as described above in which the groups identified by the letters X and Y are highly hydrolyzable groups such as a halogen group as represented by chlorine, bromine and iodine, in which the X portion of the halogen group is replaced by a hydrogen group by a reduction reaction.

The following example is given by way of illustration, and not by way of limitation, of the preparation of the silyl norbornenes of this invention by reduction of the corresponding mono- di- or trichlorosilyl norbornene:

Example 1

A 250 ml. 3-necked flask was equipped with a condenser, thermometer, addition funnel, magnetic stirrer and gas inlet. The flask was flushed with nitrogen and charged with 150 ml. anhydrous ethyl ether and 10 g. lithium aluminum hydride. 50 grams of 5-trichlorosilyl-2-norbornene were added dropwise to the flask in order to maintain a gentle reflux. After the addition was complete ($\sim\frac{1}{2}$ hour) the reaction mixture was refluxed for one hour. The reaction mixture was then cooled to room temperature, filtered under nitrogen pressure and distilled. The following fractions were obtained:

| Fraction | Dist. temp. (° C.) | Pressure at— | Amount (g.) |
|---|---|---|---|
| −1 | 56–64 | 75 mm. | 5.8 |
| −2 | 56–70 | 50 mm. | 1.5 |
| −3 | 78–96 | 20 mm. | 5.2 |
| −4 | 96 | 20 mm. | 7.7 |
| −residue | | | 17.2 |

It was determined by a nuclear magnetic spectrum that fraction −1 was 5-silyl-2-norbornene with the following characteristic nuclear magnetic absorptions. $C_2$ and $C_3$ nirbornene group $\alpha=5.98$; $SiH_3$ group two doublets for exo and endo in a ratio of 5 to 16 centered at $\alpha=3.6$ (J=3.5 c.p.s.) and $\alpha=3.37$ (J=3.5 c.p.s.). Ratio of $SiH_3$ to $C_2=C_3$ was 21 to 14. The structural formula is as follows:

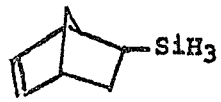

It was found that fraction −2 contained large amounts of 5-monochlorosilyl-2-norbornene which has the following structural formula:

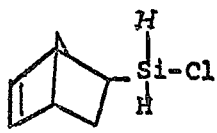

It was also found that fraction −3 contained large amounts of 5-dichlorosilyl-2-norbornene which has the following structural formula:

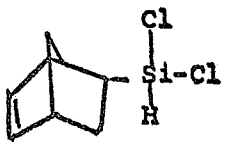

Fraction −4 was predominantly the 5-trichlorosilyl-2-norbornene starting material.

The described reduction procedure is a modification of a general procedure for the reduction of a chlorosilane with lithium aluminum hydride $LiAlH_4$ as first carried out by Schlesinger and his co-workers and described in the Journal of the American Chemical Society, 69, 2692 (1947).

Others of the halosilyl norbornenes can be substituted in equivalent amounts in Example 1 for the preparation of of the silyl norbornenes of this invention.

The silyl norbornenes of this invention are capable of addition polymerization through the active unsaturated linkage of the norbornenyl group attached to the silicon atom for interpolymerization with ethylene and at least one monoolefin having from 3–20 carbon atoms, in the preparation of a terpolymer, or with the further addition of a polyene, in the preparation of a tetrapolymer, to produce new and improved EPDM type elastomers having many new and novel characteristics, which are capable of sulfur vulcanization or cure, and more particularly are capable of a peroxide cure possibly by addition of the SiH bond across an available double bond.

The monoolefin having from 3–20 carbon atoms may be represented by the general formula $R—CH=CH_2$, wherein R is a $C_1$ to $C_{18}$ alkyl radical, which may be branched or straight chained, halogen substituted or unsubstituted and which may be represented by the compounds propylene, 1-butene, 1-pentene, 1-hexene, 1-heptene, 1-octene, 1-nonene, 1-decene, 4-methyl-1-pentene, 4-methyl-1-hexene, 4,4-dimethyl - 1 - pentene, 5-methyl-1-heptene, 6-methyl-1-heptene, etc. As the monoolefin, it is preferred to make use of propylene with the ethylene and propylene or other monoolefin present in the interpolymer in the ratio of 20–95 moles of ethylene to 80–5 moles of propylene and preferably 45–90 moles of ethylene to 55–10 moles of propylene.

As the polyene, when present in the preparation of a tetrapolymer, use can be made of an open chain polyunsaturated hydrocarbon containing 4–20 carbon atoms, such as 1,4–hexadiene, a monocyclic polyene or a polycyclic polyene, but it is preferred to make use of a polyunsaturated bridged ring hydrocarbon or halogenated bridged ring hydrocarbon such as the polyunsaturated derivatives of bicyclo(2,2,1) heptane wherein at least one of the double bonds is present in one of the bridged rings, such as dicyclopentadiene, bicyclo(2,2,1)hepta-2,5-diene, or alkylidene norbornenes and preferably a 5-alkylidene-2-norbornene wherein the alkylidene group contains from 1–20 carbon atoms and preferably 1–8 carbon atoms, or the alkenyl norbornenes, and preferably the 5-alkenyl-2-norborness wherein the alkenyl group contains from 3–20 carbon atoms and preferably from 3–10 carbon atoms. Other bridged ring hydrocarbons include polyunsaturated derivatives of bicyclo(2,2,2) octane, as represented by bicyclo(2,2,2)octa-2,5-diene, polyunsaturated derivatives of bicyclo(3,2,1)octane, polyunsaturated derivatives of bicyclo(3,3,1)nonane. At least one double bond is present in the bridged ring of the above compounds and at least one other double bond is present in a bridged ring or in a side chain. Specific examples of preferred bridged ring compounds of the type described above include 5-methylene-2-norbornene, 5-ethylidene-2-norbornene, 5-n-propylidene-2-norbornene, 5-isopropylidene-2-norbornene, 5-n-butylidene-2-norbornene, 5 - isobutylidene-2-norbornene, dicyclopendadiene, 5-(2-methyl-3-butenyl)-2-norbornene, 5-(3-methyl-2-butenyl) norbornene and 5-(3,5-dimethyl-4-hexenyl)-2-norbornene. The interpolymer prepared from 5-ethylidene-2-norbornene is greatly preferred since the combination which makes use thereof has outstanding properties and it appears to be somewhat unique by reference to the others.

The polyene or substituted polyene may be chemically bound in the interpolymer in an amount within the range of 0.1 to 10 mol percent, and preferably 0.1 to 3 mole percent, or in an amount to provide an actual or calculated unsaturation level of at least two double bonds per 1000 carbon atoms of the interpolymer chain. However, amounts to provide much higher unsaturation levels are preferred, such as levels of up to 100 double bonds per 1000 carbon atoms in the interpolymer, and preferably an amount to provide from 2.5 to 30 double bonds per 1000 carbon atoms, and more preferably 2.5 to 15 double bonds per 1000 carbon atoms. The specific unsaturation level selected to be introduced by the polyene component will vary depending upon the properties desired in the elastomeric interpolymer that is formed.

The silyl norbornene can be employed in the interpolymerization reaction mixture in an amount within the range of 0.05 to 20 percent by weight and preferably in an amount within the range of 0.1 to 5.0 percent by weight of the total monomer mixture.

The interpolymerization of the monomeric components described can be carried out in solution in an inert organic solvent, in the presence of a Ziegler type catalyst, all of which will hereinafter be described.

The polymerization solvent may be any suitable inert organic solvent which is liquid under the reaction conditions such as any prior art solvent useful for solution polymerization of monoolefins in the presence of Ziegler type catalysts. Examples of satisfactory hydrocarbon solvents include straight chain halogenated or unhalogenated paraffins containing 5–8 carbon atoms, and preferably hexane and chlorohexanes; aromatic hydrocarbons and preferably halogenated or unhalogenated aromatic hydrocarbons containing a single benzene nucleus such as benzene, hexachlorobenzene, toluene and the like; saturated cyclic hydrocarbons which have a boiling point range approximating that for the straight chain paraffin hydrocarbons and aromatic hydrocarbons discussed above, and preferably saturated cyclic halogenated or unhalogenated hydrocarbons containing 5 or 6 ring carbon atoms. The solvent may be a mixture of one or more of the foregoing hydrocarbons, such as a mixture of aliphatic and naphthenic hydrocarbons, preferably having approximately the same boiling range as normal hexane. It is important for the solvent to be dry and free of substances which will interfere with the Ziegler catalyst to be used in the polymerization process.

Ziegler catalysts, as described in the prior art, may be employed. Such Ziegler catalysts are disclosed in a large number of patents, such as U.S. Pat. No. 2,933,480, No. 3,093,620, No. 3,093,621, No. 3,211,709 and No. 3,113,115. Such Ziegler catalysts generally include metal organic coordination catalysts prepared by contacting a compound of a heavy metal of the groups IV$b$ to VII$b$ of the Mendelejeff periodic system of elements, such as titanium, vanadium and chromium halides with an organometallic compound of a metal of Groups I to III of the Mendelejeff periodic system which contains at least one carbon-metal bond, such as trialkyl aluminum and alkyl aluminum halides wherein the alkyl groups contain from 1–20 and preferably 1–4 carbon atoms.

The preferred Ziegler catalyst for the described polymerization is prepared from a vanadium compound and alkyl aluminum halide such as vanadium trichloride, vanadium tetrachloride, vanadium oxychloride, vanadium acetylacetonate, etc., and alkyl aluminum chloride activators having the general formula $R_2AlCl_2$ and $R_2AlCl$, and the corresponding sesquichlorides having the general formula $R_3Al_2Cl_3$ in which R is methyl, ethyl, propyl, butyl or isobutyl. In the catalytic system, the aluminum to vanadium mole ratio of the aluminum and vanadium compounds may be within the range of 5–200:1 and preferably within the range of 15–60:1. A catalyst prepared of alkyl aluminum sesquichloride, such as methyl or ethyl aluminum sesquichloride, and vanadium oxychloride is preferred, with the preferred ratio of 1 mole vanadium oxychloride for 5–200 moles of aluminum and preferably for each 15–60 moles of aluminum.

Generally the polymerization reaction may be carried out in a temperature range of $-40°$ to 150° C. and preferably within a temperature range of 20° to 100° C. during the course of the reaction. The polymerization reaction may be carried out at substantially atmospheric pressure but pressures up to 1000 p.s.i. may be employed.

The polymerization is preferably carried out on a continuous basis in a dry reaction vessel which is closed to the outside atmosphere and which is provided with means for agitation, reactor cooling means, and inlets and outlets for continuously supplying the ingredients of the reaction mixture including the monomer and catalyst, and for continuously withdrawing the solution of elastomer. The polymerization is carried out in a liquid phase in the organic solvent in the presence of the Ziegler catalyst and the solution of elastomer in the polymerization solvent is withdrawn continuously from the reaction vessel and the catalyst is killed by a catalyst deactivator.

The tetrapolymers of the invention may be cured in accordance with prior art procedures. As a general rule, a curing procedure which is normally followed in curing highly unsaturated hydrocarbon rubbers, such as styrene-butadiene rubber, natural rubber, polybutadiene rubber, synthetic polyisoprene rubbers and the like, will be satisfactory. Use may be made of various curing agents in effecting the rapid cure of the interpolymer.

Conventional fillers and pigments may be formulated with the interpolymer, such as 10 to 200 parts by weight of carbon black, finely divided silica, esterified silica, titanium dioxide, kaolin and whiting, per 100 parts by weight of rubber. It is also possible to extend the interpolymer with oil such as extender oils as represented by naphthenic oils usually added in an amount of 10 to 100 parts and preferably 20 to 80 parts per 100 parts by weight of rubber.

Vulcanization is accomplished by heating the compounded interpolymer at a vulcanizing temperature for a period of time sufficient for vulcanization, such as at a temperature above 130° C. for 10 to 90 minutes, and preferably within the range of 160°–180° C. for about 30 minutes.

When carrying out a free radical cure of the interpolymer and compounds formed thereof, a heat activated free radical curing agent is admixed with the interpolymer and the mixture is heated to a sufficiently high temperature to activate the curing agent for cure over a practical period of time. Usually temperatures of 50° to 175° C. for a period of several minutes to several hours is sufficient. Preferred free radical curing agents include organic peroxides such as dicumene hydroperoxide, dibenzoyl hydroperoxide, cumene hydroperoxide and ditertiarybutylperoxide.

The cured elastomers and compounds of this invention may be used in a wide variety of articles including tires, belts, hose, tubing and the like.

Having described the basic concepts of the preparation of an EPDM interpolymer using the silyl norbornene of this invention as a monomeric component thereof, the following examples are given by way of illustration, but not by way of limitation:

Example 2

This example illustrates the preparation of an EPDM type interpolymer which makes use of three monomeric components including ethylene, propylene and the silyl norbornene of this invention.

A dry flask was first flushed with nitrogen gas and filled with 100 cc. of dry hexane which was flushed with polymerization grade propylene and pressured to 15 p.s.i.g. with propylene. The flask was brought to 25 p.s.i.g. total molecular pressure by addition from a feed tank containing 65 mole percent ethylene and 35 mole percent propylene. Polymerization was carried out in a water bath maintained at 35° C. Additions were made to the flask of 0.02 mM. butyl perchlorocrotonate, 1.45 mM. of the silyl norbornene prepared in Example 1, 0.3 mM. ethyl aluminum sesquichloride and 0.005 mM. vanadium oxytrichloride.

As the polymerization proceeded, the monomer composition in ethylene and propylene was maintained constant by continuous addition from the feed tank. At 300 seconds and again at 600 seconds, 0.58 mM. silyl norbornene, 0.02 mM. butylperchlorocrotonate, 0.18 mM. ethyl aluminum sesquichloride and 0.005 mM. vanadium oxytrichloride were charged to the flask and at 900 seconds 1.0 cc. isopropanol containing 0.05 g. of Irganox 100 was added. The polymer cement was mixed with water to remove catalyst. The polymer was precipitated out of solution with 150 cc. of isopropanol, then redissolved in hexane, then reprecipitated with isopropanol. After drying in a vacuum oven at 75° C. for 12 hours, the resulting product (4.2 g.) was clear and gel-free.

Example 3

This example represents the preparation of an EPDM type interpolymer of all four monomers including ethylene, propylene, polyene and the silyl norbornene of this invention.

A cement was prepared as in Example 1 but with the polyene component, namely the 5-ethylidene-2-norbornene.

The resulting cement was treated as in Example 2.

Example 4

Others of the silyl norbornene compounds identified on pages 1 and 2 of the specification may be substituted in equivalent amounts for the 5-silyl-2-norbornene of Example 1 and the silyl norbornene of Example 2.

The interpolymers of this invention, as represented by Examples 1 to 4, have a number of unique and desirable characteristics which make them useful in a number of commercial applications:

The interpolymers have good compatibility and co-curability with other unsaturated polymers, preferably elastomers. The interpolymers of this invention are capable of cocure with SBR since the bond of the unsaturated silyl group is capable of adding readily across a double bond in the presence of traces of peroxide.

The interpolymers of this invention provide improved physical properties in mineral filled compositions due to the greater polarity of the Si-H bond.

The Si-H bond tends to produce interpolymers having properties similar to the properties of a silicone fluid insofar as surface characteristics are performed. The non-wettability of the surface permits relative movement between surfaces with a minimum amount of drag or interfacial friction.

The silyl component is effective to improve the interbonded relationship between the interpolymer and glass in the manufacture of glass fiber reinforced products as well as improved adhesion to other materials such as resins, metals and the like.

It will be understood that changes may be made in the details of formulation and composition without departing from the spirit of the invention, especially as defined in the following claims.

I claim:

1. A solid interpolymer formed by addition polymerization of a mixture of monomers consisting essentially of ethylene, at least one monoolefin having the general formula $CH_2=CH-R$ in which R is a halogen substituted or unsubstituted $C_1-C_{18}$ alkyl radical, branched or straight chained, and a monomer silyl norbornene which enters into the polymerization through the unsaturated linkage of the norbornenyl group attached to the silicon atom and which has the general formula

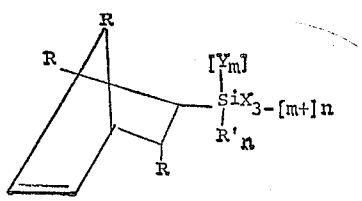

in which R is a group selected from the group consisting of hydrogen, halogenated or unhalogenated alkyl, aryl, arylalkyl, alkenyl and 6- or 7-alkylidene group, R' is a group selected from the group consisting of alkyl, aryl and alkenyl, X is hydrogen and $n$ is a number of from 0 to 2, and in which ethylene and monoolefin are present in the polymer in the mole ratio of 20-95 moles of ethylene to 85-5 moles of monoolefin, and the monomer is present within the range of 0.05 to 20% by weight of the total amount of monomeric material in the mixture.

2. A solid interpolymer formed by addition polymerization of a mixture of monomers consisting essentially of ethylene, at least one monoolefin having the general formula $CH_2=CH-R$ in which R is a halogen substituted or unsubstituted $C_1-C_{18}$ alkyl radical, branched or straight chained, a non-conjugated polyene, and a monomer silyl norbornene which enters into the polymerization through the unsaturated linkage of the norbornenyl group attached to the silicon atom and which has the general formula

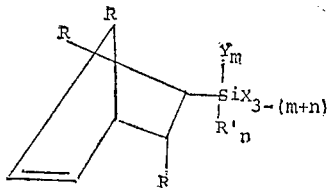

in which R is a group selected from the group consisting of hydrogen, halogenated or unhalogenated alkyl, aryl, arylalkyl, alkenyl and 6- or 7-alkylidene group, R' is a group selected from the group consisting of alkyl, aryl and alkenyl, X is hydrogen and $n$ is a number of from 0 to 2, Y is halogen and $m$ is a number from 0 to 2 such that the sum of $m$ and $n$ is never more than 2, and in which ethylene and monoolefin are present in the interpolymer in the mole ratio of 20-95 moles of ethylene to 80-5 moles of monoolefin, the monomer is present within the range of 0.05-20% by weight of the total amount of monomeric material in the mixture, in which the polyene is chemically bound in the interpolymer in an amount within the range of 0.1-10 mole percent.

3. An interpolymer as claimed in Claim 1 in which the monoolefin is propylene.

4. An interpolymer as claimed in Claim 2 in which the monoolefin is propylene.

5. An interpolymer as claimed in Claim 2 in which the polyene is bound in the interpolymer in an amount within the range of 0.1 to 3 mole percent.

6. An interpolymer as claimed in Claim 1 in which the silyl norbornene monomer is present in an amount within the range of 0.1 to 5 percent by weight.

7. An interpolymer as claimed in Claim 2 in which the silyl norbornene monomer is present in an amount within the range of 0.1 to 5 percent by weight.

8. An interpolymer as claimed in Claim 2 in which the polyene is a polyunsaturated bridged ring hydrocarbon.

9. An interpolymer as claimed in Claim 2 in which the polyene is 5-ethylidene-2-norbornene.

References Cited
UNITED STATES PATENTS

| | | | |
|---|---|---|---|
| 2,847,409 | 8/1958 | DeBenneville et al. | 260—89.7 |
| 3,240,768 | 3/1966 | Guenther | 260—88.1 |
| 3,375,236 | 3/1968 | Van de Castle et al. | 260—80.71 |

STANFORD M. LEVIN, Primary Examiner

U.S. Cl. X.R.

260—448.2 E